(12) United States Patent
Chen et al.

(10) Patent No.: US 8,379,158 B2
(45) Date of Patent: Feb. 19, 2013

(54) THREE-DIMENSIONAL DISPLAY AND DISPLAY METHOD THEREOF

(75) Inventors: Li Chen, Taipei County (TW); Chia-Chih Kao, Taoyuan County (TW); Chao-Yuan Chen, Hsinchu County (TW); Geng-Yu Liu, Miaoli County (TW); Wen-Hao Hsu, Taipei (TW); Jenn-Jia Su, Chiayi County (TW)

(73) Assignee: Au Optronics Corporation, Hsinchu (TW)

( * ) Notice: Subject to any disclaimer, the term of this patent is extended or adjusted under 35 U.S.C. 154(b) by 284 days.

(21) Appl. No.: 12/814,498

(22) Filed: Jun. 14, 2010

(65) Prior Publication Data
US 2011/0216277 A1    Sep. 8, 2011

(30) Foreign Application Priority Data

Mar. 8, 2010   (TW) .............................. 99106609 A

(51) Int. Cl.
*G02F 1/1335*   (2006.01)
(52) U.S. Cl. .......................................... 349/15; 349/117
(58) Field of Classification Search .................... 349/15, 349/117–119, 139
See application file for complete search history.

(56) References Cited

U.S. PATENT DOCUMENTS

| 7,589,810 | B2 | 9/2009 | Sugiyama | |
|---|---|---|---|---|
| 7,821,583 | B2 * | 10/2010 | Yeh et al. | 349/15 |
| 7,916,221 | B2 * | 3/2011 | Daiku | 349/15 |
| 2006/0209407 | A1 | 9/2006 | Hamagishi | |
| 2011/0157698 | A1 * | 6/2011 | Yoshimi | 359/462 |

FOREIGN PATENT DOCUMENTS

CN       101183177       5/2008

* cited by examiner

*Primary Examiner* — Dung T. Nguyen
(74) *Attorney, Agent, or Firm* — Jianq Chyun IP Office

(57) ABSTRACT

A three-dimensional (3D) display including a display panel and a phase retardation film is provided. The display panel has a plurality of first pixel regions and a plurality of second pixel regions that are arranged as an array. The phase retardation film is disposed on the surface of the display panel. The phase retardation film has a plurality of first retardation regions and a plurality of second retardation regions that are alternately arranged. The first retardation regions have the same phase retardation, the second retardation regions have the same phase retardation, and the phase retardation of the first retardation regions is different from that of the second retardation regions. All the regions of the phase retardation film have the same transmittance. A display method adaptable to the 3D display is also provided.

11 Claims, 6 Drawing Sheets

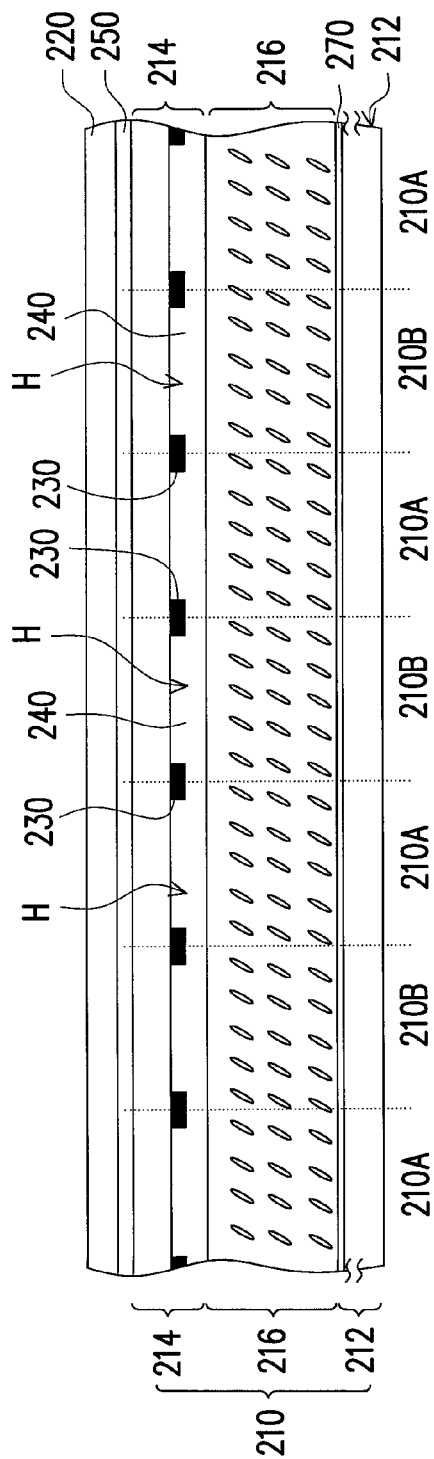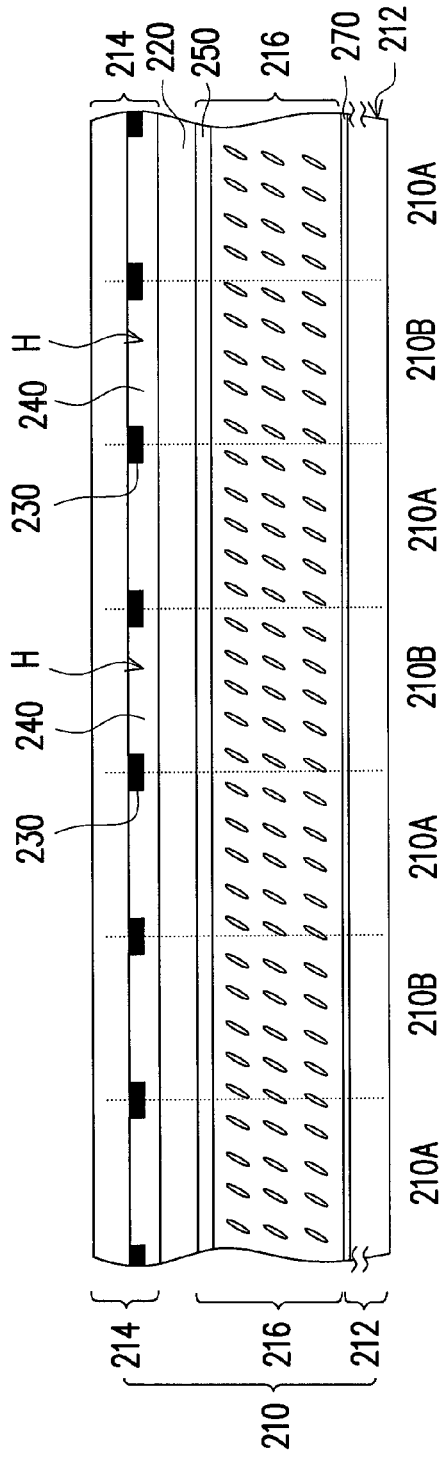

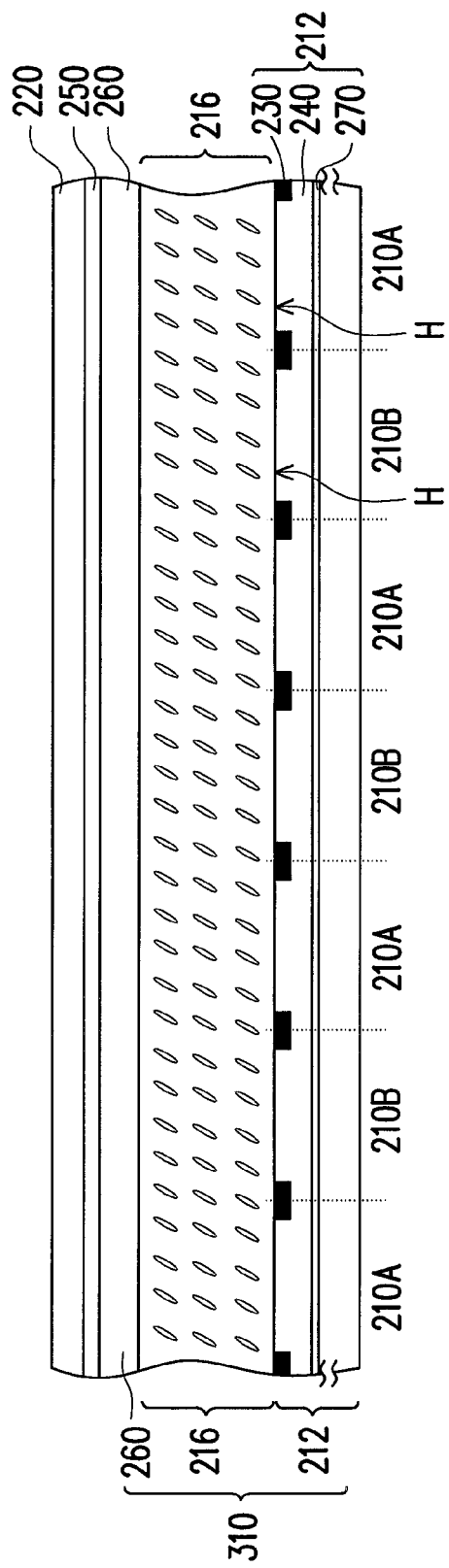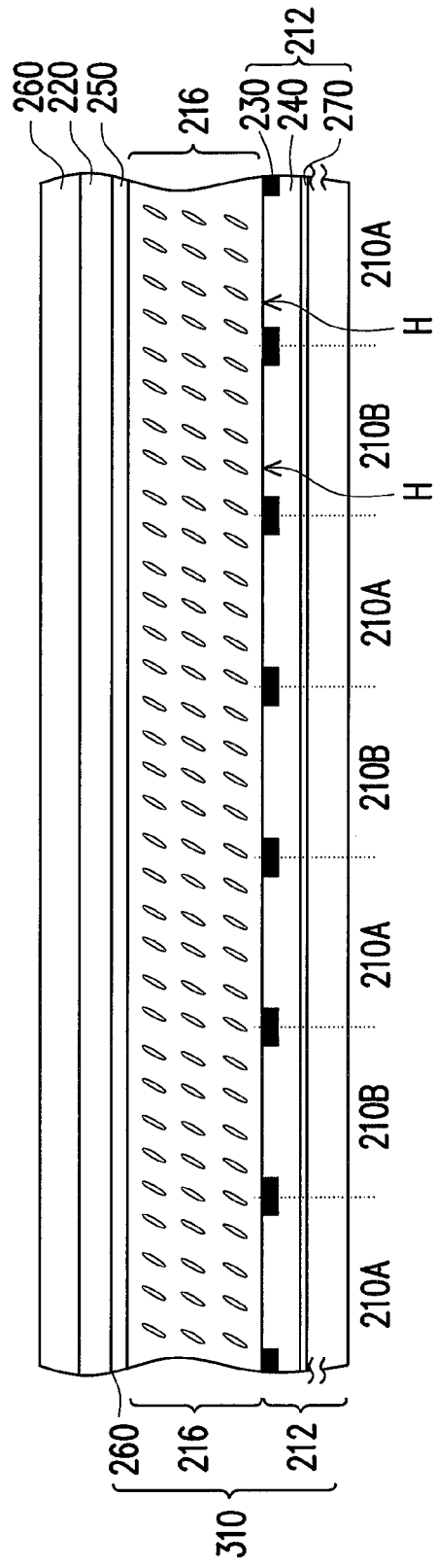
FIG. 3A
FIG. 3B

THREE-DIMENSIONAL DISPLAY AND DISPLAY METHOD THEREOF

CROSS-REFERENCE TO RELATED APPLICATION

This application claims the priority benefit of Taiwan application serial no. 99106609, filed on Mar. 8, 2010. The entirety of the above-mentioned patent application is hereby incorporated by reference herein and made a part of specification.

BACKGROUND OF THE INVENTION

1. Field of the Invention

The present invention generally relates to a display and a display method thereof, and more particularly, to a three-dimensional (3D) display and a display method thereof.

2. Description of Related Art

People have been increasing their demand both materially and spiritually along with the development of technologies. Spiritually, people want to visualize their wild imagination through display devices so as to achieve the most vivid experience. Thus, how to present three-dimensional (3D) images or videos through display devices has become a major objective in display device development. According to the operating principle of an existing 3D display, a phase retardation film with two types of phase retardation regions is attached to a display panel such that the light provided by the pixel regions for displaying a left-eye image and the light provided by the pixel regions for displaying a right-eye image have different polarization states. Accordingly, the left-eye image and the right-eye image are respectively transmitted to the left eye and the right eye through a pair of head goggles and form a 3D image in a user's brain.

However, in order to prevent the light provided by the pixel regions from passing through incorrect phase retardation regions and accordingly presenting an incorrect image to the user, a black matrix has to be disposed between the two types of phase retardation regions of the phase retardation film. As a result, the brightness and viewing angle range of the display device for displaying two-dimensional (2D) images are greatly reduced, and the hardware cost of the phase retardation film is increased.

SUMMARY OF THE INVENTION

Accordingly, the present invention is directed to a three-dimensional (3D) display, wherein all regions of a phase retardation film in the 3D display have the same transmittance so that a high display brightness and a wide viewing angle range of the 3D display are retained while two-dimensional (2D) images are displayed.

The present invention is directed to a display method, wherein 3D images or 2D images are selectively displayed according to a user's requirement through appropriate disposition on a display panel.

The present invention provides a 3D display including a display panel and a phase retardation film. The display panel has a plurality of first pixel regions and a plurality of second pixel regions that are arranged as an array. The phase retardation film is disposed on the surface of the display panel. The phase retardation film has a plurality of first retardation regions and a plurality of second retardation regions that are alternatively arranged. The first retardation regions have the same phase retardation, the second retardation regions has the same phase retardation, and the phase retardation of the first retardation regions is different from that of the second retardation regions. All the regions of the phase retardation film have the same transmittance.

According to an embodiment of the present invention, each of the first pixel regions corresponding to any one of the first retardation regions or any one of the second retardation regions has a first area, and each of the second pixel regions corresponding to both one of the first retardation regions and an adjacent one of the second retardation regions has a second area, wherein each of the first areas is greater than or equal to each of the second areas.

According to an embodiment of the present invention, each of the first areas is twice each of the second areas.

According to an embodiment of the present invention, the display panel includes an active device array substrate, a color filter substrate, and a liquid crystal layer. The active device array substrate has an active device array. The color filter substrate has a black matrix and a plurality of color filter films. The black matrix has a plurality of openings, wherein each of the openings is corresponding to one of the first pixel regions or one of the second pixel regions, and each of the openings is corresponding to one of the color filter films. The liquid crystal layer is disposed between the active device array substrate and the color filter substrate. The 3D display may further include a polarizer. The polarizer may be disposed on an external surface of the color filter substrate, and the phase retardation film may be disposed on the polarizer. Or, the polarizer may also be disposed on an internal surface of the color filter substrate, and the phase retardation film may be disposed between the polarizer and the color filter substrate.

According to an embodiment of the present invention, the display panel includes an active device array substrate, an opposite substrate, and a liquid crystal layer. The active device array substrate has an active device array, a black matrix, and a plurality of color filter films. The black matrix has a plurality of openings, wherein each of the openings is corresponding to one of the pixel regions, and each of the openings is corresponding to a color filter film. The liquid crystal layer is disposed between the active device array substrate and the opposite substrate. The 3D display may further include a polarizer. The polarizer may be disposed on an external surface of the opposite substrate, and the phase retardation film may be disposed on the polarizer. Or, the polarizer may also be disposed on an internal surface of the opposite substrate, and the phase retardation film may be disposed between the polarizer and the opposite substrate.

According to an embodiment of the present invention, the first retardation regions may be 1/4 phase retardation regions, and the second retardation regions may be 3/4 phase retardation regions.

According to an embodiment of the present invention, the display panel may be a polymer stabilized alignment liquid crystal display (PSA LCD) panel.

The present invention also provides a display method adaptable to the 3D display described above. The display method includes following steps. In a 2D display state, all the first pixel regions and second pixel regions of the display panel are used for displaying a 2D image. In a 3D display state, only the first pixel regions of the display panel are used, and the second pixel regions are in a dark state.

As described above, the present invention provides a 3D display and a display method thereof, wherein an image displayed by the display panel is converted into an image with 3D information by using the first retardation regions and the second retardation regions of the phase retardation film that have different phase retardations, so that a 3D image can be presented to a user through a pair of head goggles. On the other hand, because the first retardation regions and the second retardation regions of the phase retardation film that have different phase retardations have the same transmittance and no light-blocking component (for example, a black matrix) is disposed, a high brightness and a wide viewing angle range can be achieved by the 3D display and the display method thereof in the present invention while 2D images are displayed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A and FIG. 2B are respectively a cross-sectional view of a 3D display according to an embodiment of the present invention.

FIG. 3A and FIG. 3B are respectively a cross-sectional view of a 3D display according to an embodiment of the present invention.

DESCRIPTION OF THE EMBODIMENTS

Figure 1:
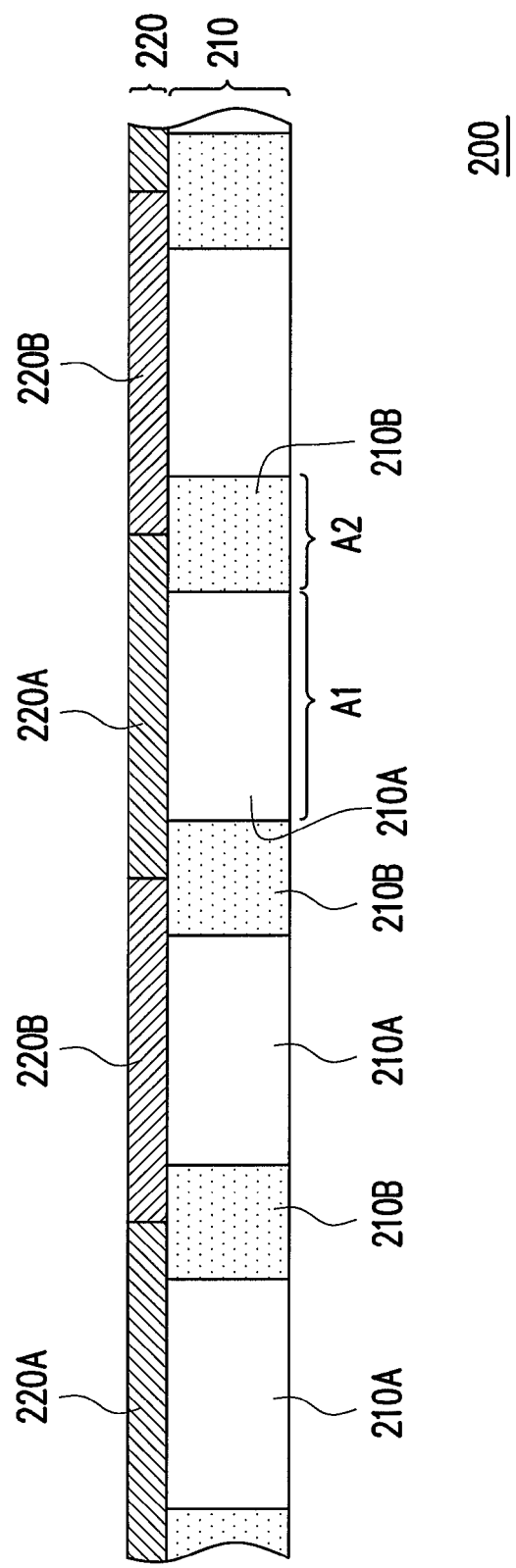
FIG. 1 is a cross-sectional view of a three-dimensional (3D) display according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides a three-dimensional (3D) display that can display two-dimensional (2D) or 3D images according to actual requirement. Besides, all the regions of a phase retardation film attached to a display panel of the 3D display have the same transmittance and no black matrix is disposed between two different types of phase retardation regions, a high brightness and a wide viewing angle range are achieved by the 3D display when 2D images are displayed. Below, embodiments of the present invention will be described in detail with reference to accompanying drawings.

FIG. 1 is a cross-sectional view of a 3D display according to an embodiment of the present invention. Referring to FIG. 1, the 3D display 200 includes a display panel 210 and a phase retardation film 220. The display panel 210 has a plurality of first pixel regions 210A and a plurality of second pixel regions 210B that are arranged as an array, and the phase retardation film 220 is disposed on the surface of the display panel 210. To be specific, the phase retardation film 220 has a plurality of first retardation regions 220A and a plurality of second retardation regions 220B, wherein the first retardation regions 220A and the second retardation regions 220B are alternatively arranged, the first retardation regions 220A have the same phase retardation, the second retardation regions 220B have the same phase retardation, and the phase retardation of the first retardation regions 220A is different from that of the second retardation regions 220B. To be specific, the first retardation regions 220A and the second retardation regions 220B may respectively be 1/4 phase retardation regions and 3/4 phase retardation regions such that an image displayed by the display panel 210 can produce different polarization states (for example, levorotary circular polarized light and dextrorotary circular polarized light) when it passes through the phase retardation film 220. Accordingly, images having different polarization states are respectively transmitted to a user's left eye and right eye and form a 3D image in the user's brain through a pair of head goggles.

In particular, all the regions 220A and 220B of the phase retardation film 220 have the same transmittance. In other words, in the 3D display 200 of the present invention, the phase retardation film 220 is not disposed with any light-blocking component (for example, a black matrix 230) but is simply composed of the first retardation regions 220A and the second retardation regions 220B. Thereby, the image displayed by the display panel 210 can pass through the phase retardation film 220 smoothly, and the brightness of the image or the viewing angle range won't be reduced due to the existence of the light-blocking component, such as the black matrix 230. Thus, the 3D display 200 in the present invention offers a high brightness and a wide viewing angle range.

Referring to FIG. 1 again, the relationship between the first pixel regions and the second pixel regions of the display panel and the first retardation regions and the second retardation regions of the phase retardation film will be further described below. As shown in FIG. 1, in the present embodiment, the first pixel regions 210A are located completely within the coverage of the first retardation regions 220A or the second retardation regions 220B, and the second pixel regions 210B cover the border between the first retardation regions 220A and the second retardation regions 220B. In other words, the first pixel regions 210A are completely corresponding to the same retardation regions (for example, the first pixel regions 210A are completely corresponding to the first retardation regions 220A or the second retardation regions 220B), and the second pixel regions 210B are corresponding to two different types of retardation regions. Thus, when the 3D display 200 is in a 3D display state, the 3D display 200 controls the second pixel regions 210B to present a dark state so that light is prevented from passing through incorrect phase retardation regions and accordingly presenting an incorrect image to the user. Since it is not needed to dispose the black matrix 230 (as shown in FIG. 2 and FIG. 3) between the two types of phase retardation regions of the phase retardation film 220, the fabricating cost of the phase retardation film 220 is also reduced.

Additionally, a special design of the relationship between the areas of the first pixel regions 210A and the second pixel regions 210B may be further adopted in order to increase the display brightness of the 3D display in the 3D display state and the display quality of the 3D display in the 2D display state. To be specific, each first pixel region 210A corresponding to any one of the first retardation regions 220A or any one of the second retardation regions 220B has a first area A1, and each second pixel regions 210B corresponding to both a first retardation region 220A and an adjacent second retardation region 220B has a second area A2. Preferably, each first area A1 is greater than or equal to each second area A2, and in the present embodiment, each first area A1 is preferably twice each second area A2.

It should be mentioned that the display panel 210 may be a liquid crystal display (LCD) panel or other display panel with a polarizer attached to the surface thereof. Taking a LCD panel as an example, the LCD panel may be composed of an active device array substrate, a color filter substrate, and a liquid crystal layer or integrated with a color filter on array (COA). Below, various components of the display panel and the dispositions of these components and the phase retardation film will be described with reference to an embodiment of the present invention.

FIG. 2A and FIG. 2B are respectively a cross-sectional view of a 3D display according to an embodiment of the present invention, wherein the display panel is composed of an active device array substrate, a color filter substrate, and a liquid crystal layer. Referring to FIG. 2A first, the display panel 210 includes an active device array substrate 212, a color filter substrate 214, and a liquid crystal layer 216. The active device array substrate 212 has an active device array 270. The color filter substrate 214 has a black matrix 230 and a plurality of color filter films 240, wherein the black matrix 230 has a plurality of openings H, wherein each of the openings H is corresponding to a first pixel region 210A or a second pixel region 210B, and each of the openings H is corresponding to a color filter film 240. The liquid crystal layer 216 is disposed between the active device array substrate 212 and the color filter substrate 214. Besides, the 3D display 200 may further include a polarizer 250. As shown in FIG. 2A, the polarizer 250 is disposed on the external surface of the color filter substrate 214, and the phase retardation film 220 is disposed on the polarizer 250. However, as shown in FIG. 2B, the polarizer 250 may also be disposed on the internal surface of the color filter substrate 214, and the phase retardation film 220 may be disposed between the polarizer 250 and the color filter substrate 214. The disposition of the polarizer 250 is not limited in the present invention.

FIG. 3A and FIG. 3B are respectively a cross-sectional view of a 3D display according to an embodiment of the present invention, wherein the display panel 310 is integrated with a COA. Referring to FIG. 3A first, the display panel 310 includes an active device array substrate 212, an opposite substrate 260, and a liquid crystal layer 216. In the present embodiment, the active device array substrate 212 has an active device array 270, a black matrix 230, and a plurality of color filter films 240. The black matrix 230 has a plurality of openings H, wherein each of the openings H is corresponding to a pixel region (the pixel region may be a first pixel region 210A or a second pixel region 210B), and each of the openings H is corresponding to a color filter film 240. The liquid crystal layer 216 is disposed between the active device array substrate 212 and the opposite substrate 260. Besides, as shown in FIG. 3A, the polarizer 250 of the 3D display 200 may be disposed on the external surface of the opposite substrate 260, and the phase retardation film 220 may be disposed on the polarizer 250. However, as shown in FIG. 3B, the polarizer 250 may also be disposed on the internal surface of the opposite substrate 260, and the phase retardation film 220 may be disposed between the polarizer 250 and the opposite substrate 260. The disposition of the polarizer 250 is not limited in the present invention.

It should be mentioned that the type of the display panel is not limited in the present invention. For example, the display panel may be an in-plane switching (IPS) LCD panel, a multi domain vertical alignment (MVA) LCD panel, a twisted nematic (TN) LCD panel, or a polymer stabilized alignment (PSA) LCD panel. Below, the present invention will be further described by taking a PSA LCD panel as an example.

Figure 4:
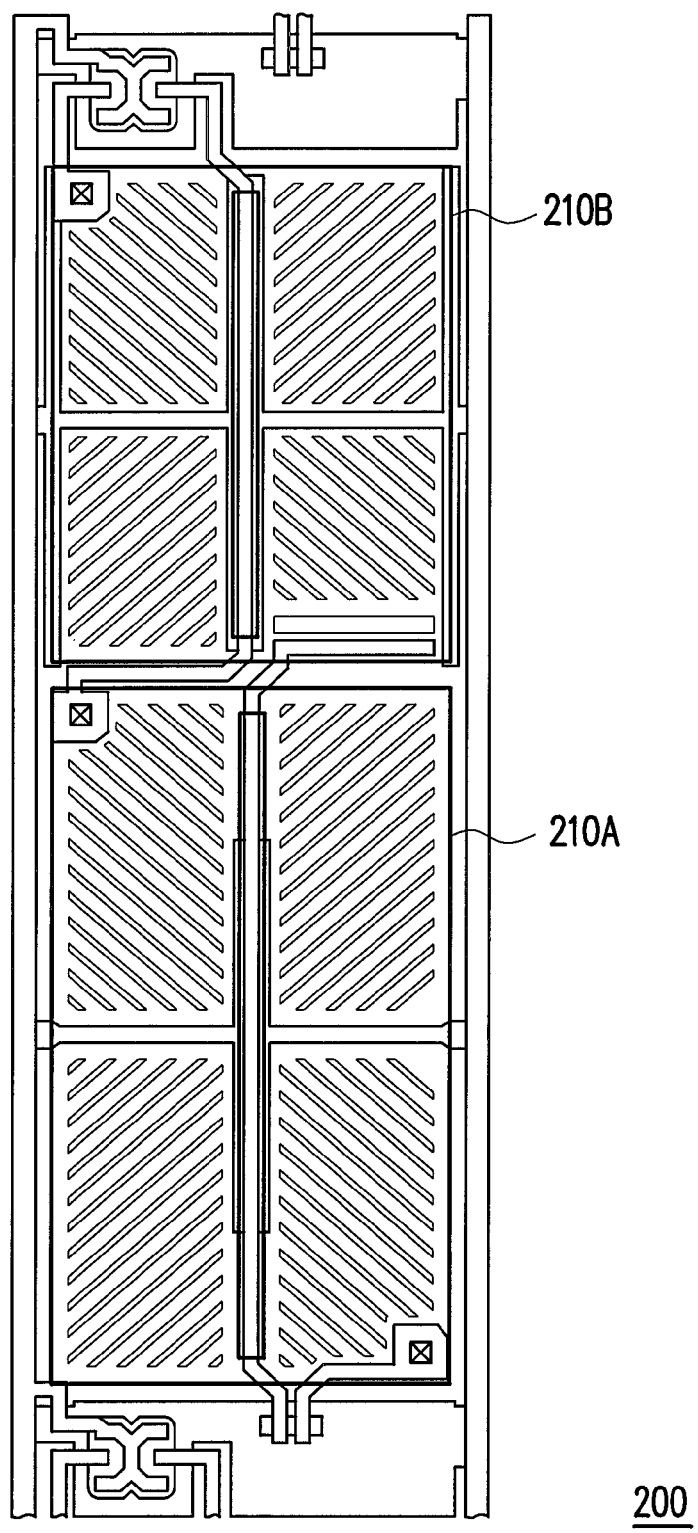
FIG. 4 is a partial top view of a display panel of a 3D display according to an embodiment of the present invention, wherein the display panel is a polymer stabilized alignment liquid crystal display (PSA LCD) panel.
Figure 5A:
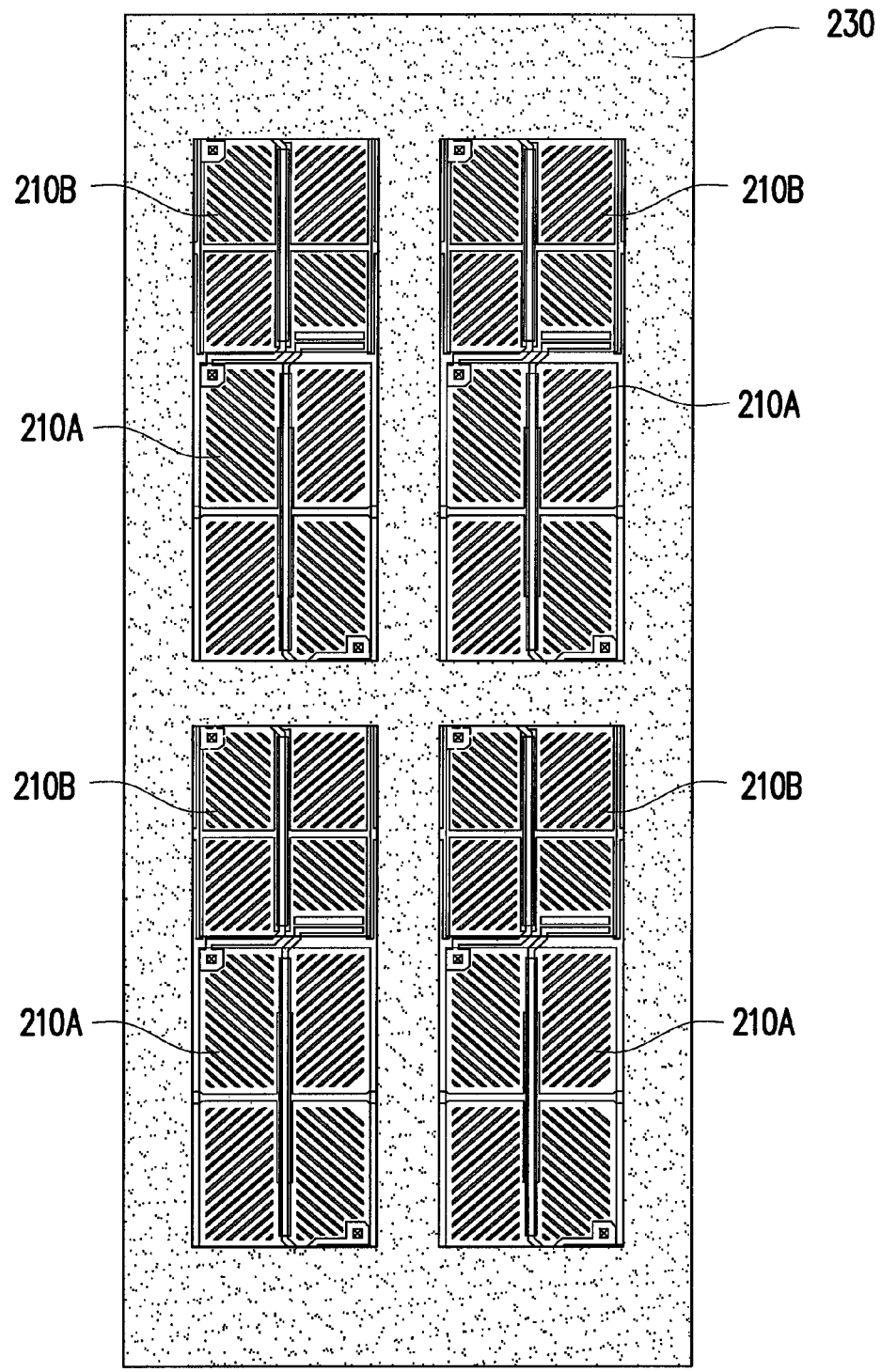
FIG. 5A and FIG. 5B are respectively a diagram of a 3D display with the display panel in FIG. 4, wherein the 3D display is respectively in a two-dimensional (2D) display state and a 3D display state.
Figure 5B:
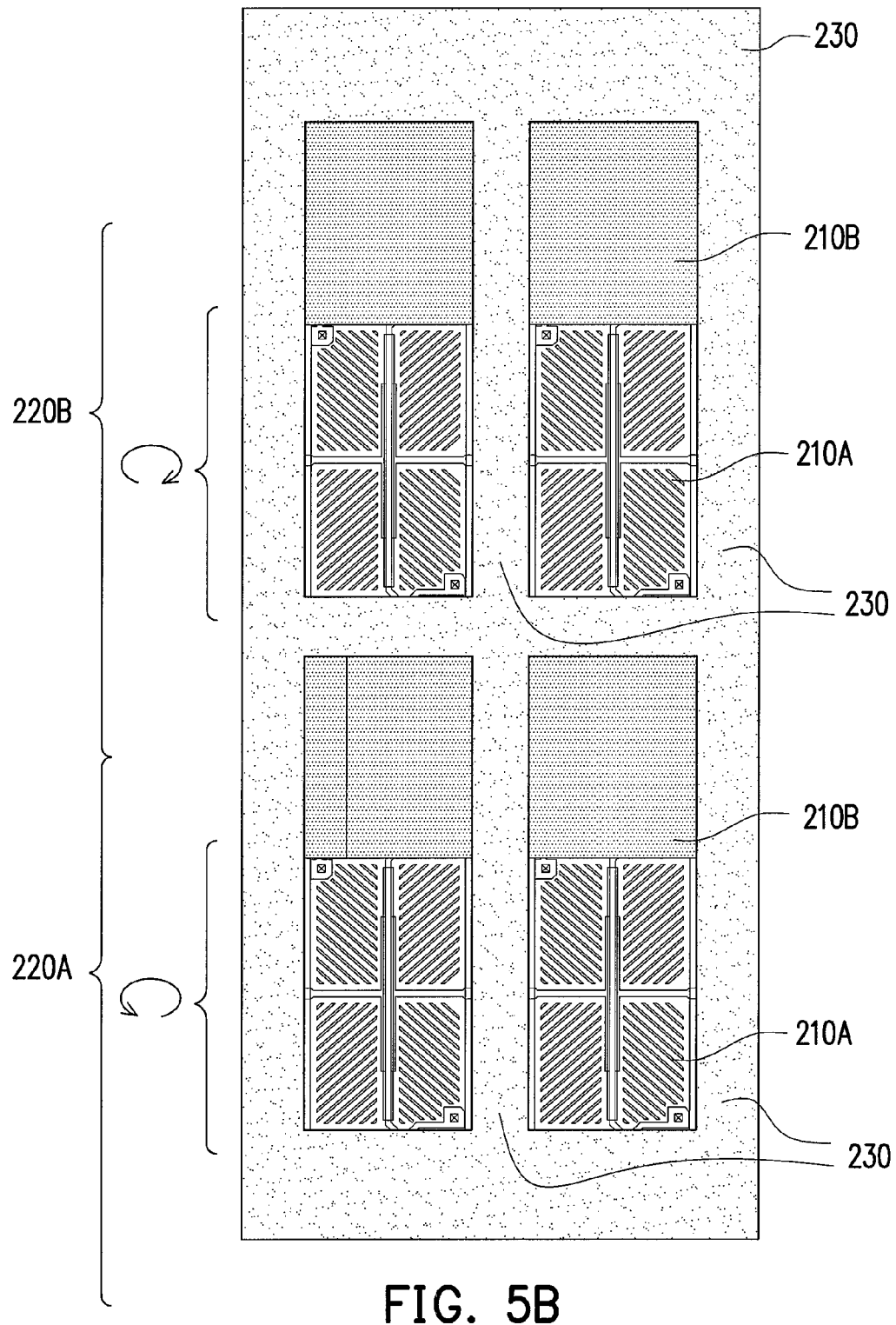

FIG. 4 is a partial top view of a display panel of a 3D display according to an embodiment of the present invention, wherein the display panel is a PSA LCD panel. In FIG. 4, only one first pixel region 210A and one second pixel region 210B are illustrated as examples. FIG. 5A and FIG. 5B are respectively a diagram of a 3D display with the display panel 210 in FIG. 4, wherein the 3D display is respectively in a 2D display state and a 3D display state. As shown in FIG. 4, the display panel 210 has a first pixel region 210A and a second pixel region 210B. Below, a display method adaptable to a 3D display will be described below with reference to FIG. 4, FIG. 5A, and FIG. 5B by taking the display panel illustrated in FIG. 4 as an example. For the convenience of description, only the structures of the first pixel region 210A, the second pixel region 210B, the first retardation region 220A, the second retardation region 220B, and the black matrix 230 in the display panel 210 are demonstratively illustrated while other possible components are omitted in FIG. 5A and FIG. 5B.

First, referring to FIG. 5A, when the 3D display 200 is in the 2D display state, the 3D display 200 uses all the first pixel regions 210A and second pixel regions 210B of the display panel 210 for displaying a 2D image. Herein since all the retardation regions of the phase retardation film 220 in the 3D display 200 have the same transmittance and no light-blocking component (for example, a black matrix) is disposed in the phase retardation film 220 according to the present invention, the 3D display 200 manifests a very high brightness and a wide viewing angle range in the 2D display state.

On the other hand, referring to FIG. 5B, when the 3D display 200 is in the 3D display state, the 3D display 200 controls the second pixel regions 210B corresponding to both types of retardation regions to present a dark state and uses all the first pixel regions 210A of the display panel 210 for displaying an image. After the image displayed by the first pixel regions 210A passes through the phase retardation film 220 having different phase retardations, the image displayed by the first pixel regions 210A presents different polarization states after it respectively passes through the first retardation regions 220A and the second retardation regions 220B, wherein the first retardation regions 220A may be 1/4 phase retardation regions, and the second retardation regions 220B may be 3/4 phase retardation regions. When the image displayed by the first pixel regions 210A passes through the 1/4 phase retardation regions and the 3/4 phase retardation regions, it respectively produces different polarization states (for example, levorotary circular polarized light and dextrorotary circular polarized light) such that a 3D image can be presented to the user through a pair of head goggles.

According to an embodiment, in the 2D display state, the first pixel regions 210A and the second pixel regions 210B respectively have a switch device and display different information therefore are respectively served as an independent pixel unit (not shown). However, according to another embodiment, in the 2D display state, the first pixel regions 210A and the second pixel regions 210B display an image all together therefore are served as pixel units (including primary display units and secondary display units). In this case, the first pixel regions 210A having a greater aperture ratio are served as the primary display units, while the second pixel regions 210B are served as the secondary display units. Thereby, color washout produced when a 2D image is displayed is reduced.

As described above, the present invention provides a 3D display and a display method thereof, wherein the first retardation regions and the second retardation regions of a phase retardation film having different phase retardations have the same transmittance, so that not only 3D images can be displayed, a high image display brightness and a wide viewing angle range can be achieved by the 3D display and the display method thereof when 2D images are displayed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three-dimensional (3D) display, comprising:
a display panel, having a plurality of first pixel regions and a plurality of second pixel regions that are arranged as an array; and
a phase retardation film, disposed on a surface of the display panel, having a plurality of first retardation regions and a plurality of second retardation regions that are alternatively arranged, wherein the first retardation regions have a same phase retardation, the second retardation regions have a same phase retardation, the phase retardation of the first retardation regions is different from the phase retardation of the second retardation regions, and all the first retardation regions and the second retardation regions of the phase retardation film have same transmitted light through the first retardation regions and the second retardation regions, each of the first pixel regions corresponding to any one of the first retardation regions or any one of the second retardation regions has a first area, each of the second pixel regions corresponding to both one of the first retardation regions and an adjacent one of the second retardation regions has a second area, and each of the first areas is greater than each of the second areas.

2. The 3D display according to claim 1, wherein each of the first areas is twice each of the second areas.

3. The 3D display according to claim 1, wherein the display panel comprises:
an active device array substrate, having an active device array;
a color filter substrate, having a black matrix and a plurality of color filter films, wherein the black matrix has a plurality of openings, each of the openings is corresponding to one of the first pixel regions or one of the second pixel regions, and each of the openings is corresponding to one of the color filter films; and
a liquid crystal layer, disposed between the active device array substrate and the color filter substrate.

4. The 3D display according to claim 3 further comprising a polarizer, wherein the polarizer is disposed on an external surface of the color filter substrate, and the phase retardation film is disposed on the polarizer.

5. The 3D display according to claim 3 further comprising a polarizer, wherein the polarizer is disposed on an internal surface of the color filter substrate, and the phase retardation film is disposed between the polarizer and the color filter substrate.

6. The 3D display according to claim 1, wherein the display panel comprises:
an active device array substrate, having an active device array, a black matrix, and a plurality of color filter films, wherein the black matrix has a plurality of openings, each of the openings is corresponding to one of the first pixel regions or one of the second pixel regions, and each of the openings is corresponding to one of the color filter films;
an opposite substrate; and
a liquid crystal layer, disposed between the active device array substrate and the opposite substrate.

7. The 3D display according to claim 6 further comprising a polarizer, wherein the polarizer is disposed on an external surface of the opposite substrate, and the phase retardation film is disposed on the polarizer.

8. The 3D display according to claim 6 further comprising a polarizer, wherein the polarizer is disposed on an internal surface of the opposite substrate, and the phase retardation film is disposed between the polarizer and the opposite substrate.

9. The 3D display according to claim 1, wherein the first retardation regions are 1/4 phase retardation regions, and the second retardation regions are 3/4 phase retardation regions.

10. The 3D display according to claim 1, wherein the display panel is a polymer stabilized alignment liquid crystal display (PSA LCD) panel.

11. A display method, adaptable to the 3D display according to claim 1, the display method comprising:
in a two-dimensional (2D) display state, using all the first pixel regions and the second pixel regions of the display panel for displaying a 2D image; and
in a 3D display state, using only the first pixel regions of the display panel, wherein the second pixel regions are in a dark state.

* * * * *